United States Patent
Carlson

[15] 3,675,479
[45] July 11, 1972

[54] SPRING TESTER

[72] Inventor: Harold C. R. Carlson, 3457 Weidner Avenue, Oceanside, N.Y. 11572

[22] Filed: Sept. 10, 1970

[21] Appl. No.: 71,038

[52] U.S. Cl. .................................................. 73/161
[51] Int. Cl. .............................. G01n 3/26, G01l 1/04
[58] Field of Search ............ 73/161; 177/225, 229, 246

[56] References Cited

UNITED STATES PATENTS

| 1,874,780 | 8/1932 | McGuckin | 73/161 |
| 1,992,987 | 3/1935 | Bitzer | 73/161 |

FOREIGN PATENTS OR APPLICATIONS

| 112,519 | 8/1900 | Germany | 177/229 |

*Primary Examiner*—Louis R. Prince
*Assistant Examiner*—Denis E. Corr
*Attorney*—Leonard H. King

[57] ABSTRACT

A spring tester is provided with an easily changeable and readily adjustable load cell assembly for indicating the force exerted by a spring. A second indicator provides a measurement of the deflection of a spring under a given load. In combination with the load cell assembly, means in the form of an adjustable force gage positioned intermediate the sample under test and the load cell are provided for measuring the compression or extension of a spring at a given force. Compensating means are provided for the force gage. The apparatus also includes quickly adjustable, manually operated means for measuring the force of a spring at two different compressed lengths.

6 Claims, 6 Drawing Figures

INVENTOR.
HAROLD C.R. CARLSON
BY Leonard H. King
ATTORNEY

INVENTOR.
HAROLD C.R. CARLSON
BY
Leonard H. King
ATTORNEY

INVENTOR.
HAROLD C. R. CARLSON
BY
Leonard H. King
ATTORNEY

SPRING TESTER

The aforementioned abstract is neither intended to define the invention of the application which, of course, is measured by the claims, nor is it intended to be limiting as to the scope of the invention in any way.

The present invention relates generally to testing apparatus and more particularly to testing apparatus for resilient members such as springs, bellows or the like.

BACKGROUND OF THE INVENTION

The present invention provides a highly accurate, precision spring tester for measuring the loads and deflections of compression and extension springs. General purpose testing and also high quantity production testing is feasable with the structure defined by the present invention. It has been found that 500 to 800 tests can be made per hour, the speed of the testing depending upon the type of spring under test and the ability of the operator to place it in position and then deflect the handle. For production testing, stops are provided to test springs at exact lengths and at definite deflections or to a specific load. The force imparted by the spring under test can be read accurately to within one quarter of one percent and the spring lengths can be read within 0.007 inch. For greater accuracy, means may be provided for reading the spring lengths to within 0.001 inch. An optional accessory to the present invention is an assembly for measuring the tipping of a compressed spring anywhere from 0° to 7°. The accessory also shows the strong side of the spring so that it may subsequently be reground to a square configuration.

Accordingly, it is the primary object of the present invention to provide an improved tester for springs, bellows or the like.

It is another object of this invention to provide an easily interchangeable load cell assembly so that one tester has several different load capacities.

It is a feature of this invention that the tester is completely mechanical and does not require any electronic components.

An advantage of the present invention is that quantity production testing is made possible by the provision of two different length load stops.

An important feature of the present invention is the provision of means for adjusting a force gage that is coupled to the load cell assembly so as to accurately calibrate the present invention with respect to a known weight of the National Bureau of Standards.

An important feature of the load assembly of the present invention is that the force gage therefor is fastened at the center leaving the ends free to move as deflection occurs thereby providing an accurate load reading without the necessity of allowing or compensating for the load required to deflect the load indicator.

An advantage of the present invention is that the same load cell assembly can accommodate different force gages so that the load cell assembly is adaptable for use with several different load capacities.

These and other objects, features and advantages of the invention will, in part, be pointed out with particularity, and will, in part, become obvious from the following more detailed description of the invention taken in conjunction with the accompanying drawings which form an integral part thereof.

In the various figures of the drawing like reference characters designate like parts.

IN THE DRAWING

Figure 1:
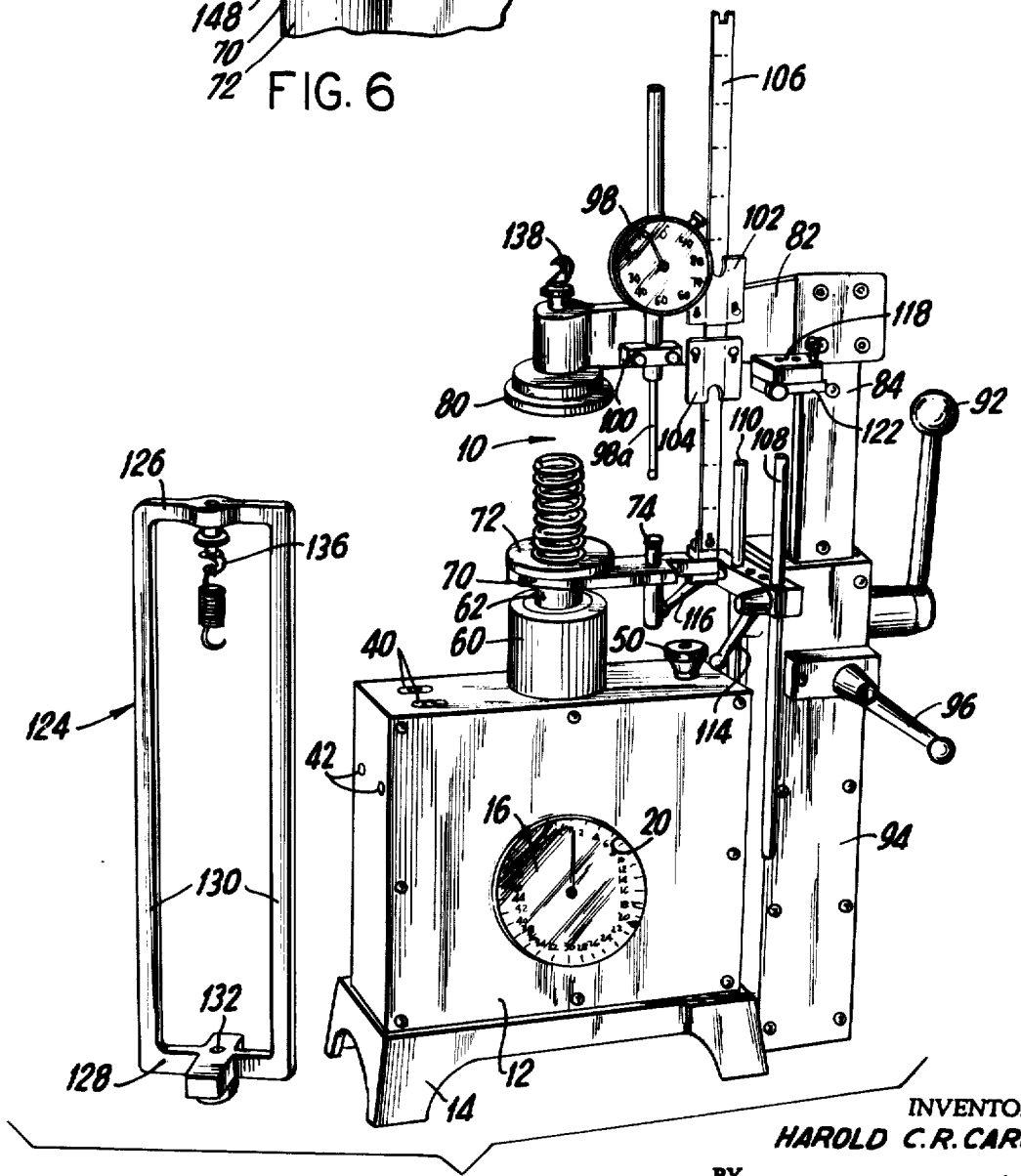
FIG. 1 is a perspective view of the present invention together with an attachment therefor for measuring extension springs.

Referring now to the drawing, there is shown in FIG. 1 the spring tester 10 comprising the present invention. A housing 12 is secured to a base 14 to permit mounting of the spring tester 10 on a bench. The housing 12 encloses a two-revolution indicator 16 that is removably mounted on a bar 18 secured to the housing 12. A plunger 16a is provided integrally with the indicator 16 in a conventional manner. The front wall of the housing 12 includes a cut out 20 for receiving the face scale of the indicator 16. A force gage, generally designated by the reference character 22 is also contained within the housing 12. The force gage 22 is comprised of a straightened and flat strip 24 made of A.I.S.I. 1075 or 1095 spring steel that is hardened, tempered and polished. Indicator 16 measures the deflection of strip 24.

The outboard ends of the force gage strip 24 are supported on transverse shafts 26 and 28 that are journaled in roller bearings 30 and 32, respectively. Enlarged diameters 26a and 28a tangentially contact the strip 24. Yoke members 34 and 36 support the roller bearings 30 and 32, respectively. The yokes 34, 36, both of which are substantially U-shaped in cross-section, are secured to the top cover plate 12a of the housing 12 such that when the position of the yokes 34 and 36 are changed, as will be described more fully hereinafter under the heading "MODE OF OPERATION-COMPRESSION SPRINGS," the effective length of the force gage strip 24 will be changed.

The yoke 34 is accurately oriented at the factory and then clamped by means of screws 38 that are located in elongated slots 40 formed in the cover plate 12a. The yoke 34 is maintained in its adjusted position by means of set screws 42 that extend through the left side wall 12b of the housing 12. The other yoke 36 is provided with a threaded shaft 44 that extends upwardly through the cover plate 12a. The threaded shaft 44 is rigidly secured to the yoke 36 by means of a pin 46.

Intermediate the top surface of the yoke 36 and the inside surface of the cover plate 12a is a compression spring 48 that encircles the threaded shaft 44. The outside portion of the threaded shaft 44 is provided with a knob 50, the purpose of which will be described in the section headed "MODE OF OPERATION-COMPRESSION SPRINGS." The yoke 36 maintained in position relative to the strip 24 by means of set screws 52 and nuts 54. For purposes to be described hereinafter there is also provided an axially adjustable screw 56 and a lock nut 58 positioned on top of the post 18 in order to limit the downward deflection of the strip 24.

A bearing support member 60 is mounted on the cover plate 12a and is provided therein with a bearing (not shown) and a cylinder member 62. A clamp ring 64 positioned immediately adjacent the inside surface of the cover plate 12a limits the upward movement of the cylinder 62. The force gage strip 24 is clamped between upper and lower bars 66 and 68, respectively, that are secured to the lower transverse face of the cylinder member 62. A generally rectangular plate 70 is secured to the upper transverse face of the cylinder member 62, and, in turn, a substantially circular lower compression plate 72 is secured to the top of the rectangular plate 70. An adjustably positioned stop member 74 is also clamped in the plate 70 by means of a screw 76 and a block 78 is secured to the end of the plate 70 opposite to the cylinder member 62.

A second circular upper compression plate 80 is mounted in opposition to the lower plate 72 on an arm 82. A column 84 supports the arm 82, the arm 84 being arranged for reciprocating vertical movement by means of a rack 86 and a pinion 88 in meshing engagement therewith. The pinion 88 is secured to a shaft 90 that is rotated by means of a handle 92. The column 84 and the rack 86 integral therewith are mounted in a post 94. A second handle 96 is used to clamp the post 94 against the column 84 to thereby arrest the selectively upward or downward movement of the column 84 and the plate 80. A second indicator 98, calibrated for linear measurement, is mounted on the arm 82 by means of a bracket 100, the plunger 98a of the indicator 98 being in coaxial opposition to the stop member 74. A pair of transparent guide members 102 and 104 are also secured to the arm 82, each of the guide members 102 and 104 having reference marks 102 a and 104 a, respectively. A scale 106 is positioned between the guide members 102, 104, and the arm 82 with one end of the scale 106 being fastened to the block 78 that is integral with the arm 70.

Figure 3:
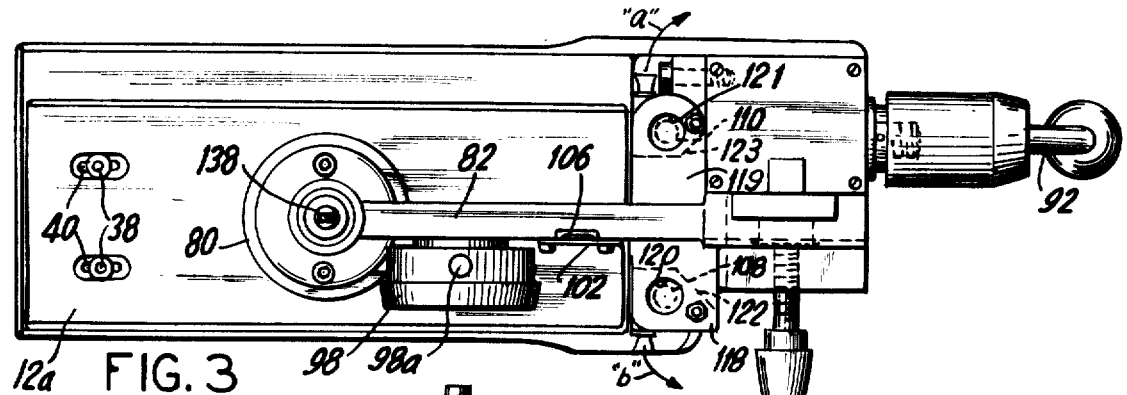
FIG. 3 is a plan view of the present invention.
Figure 2:
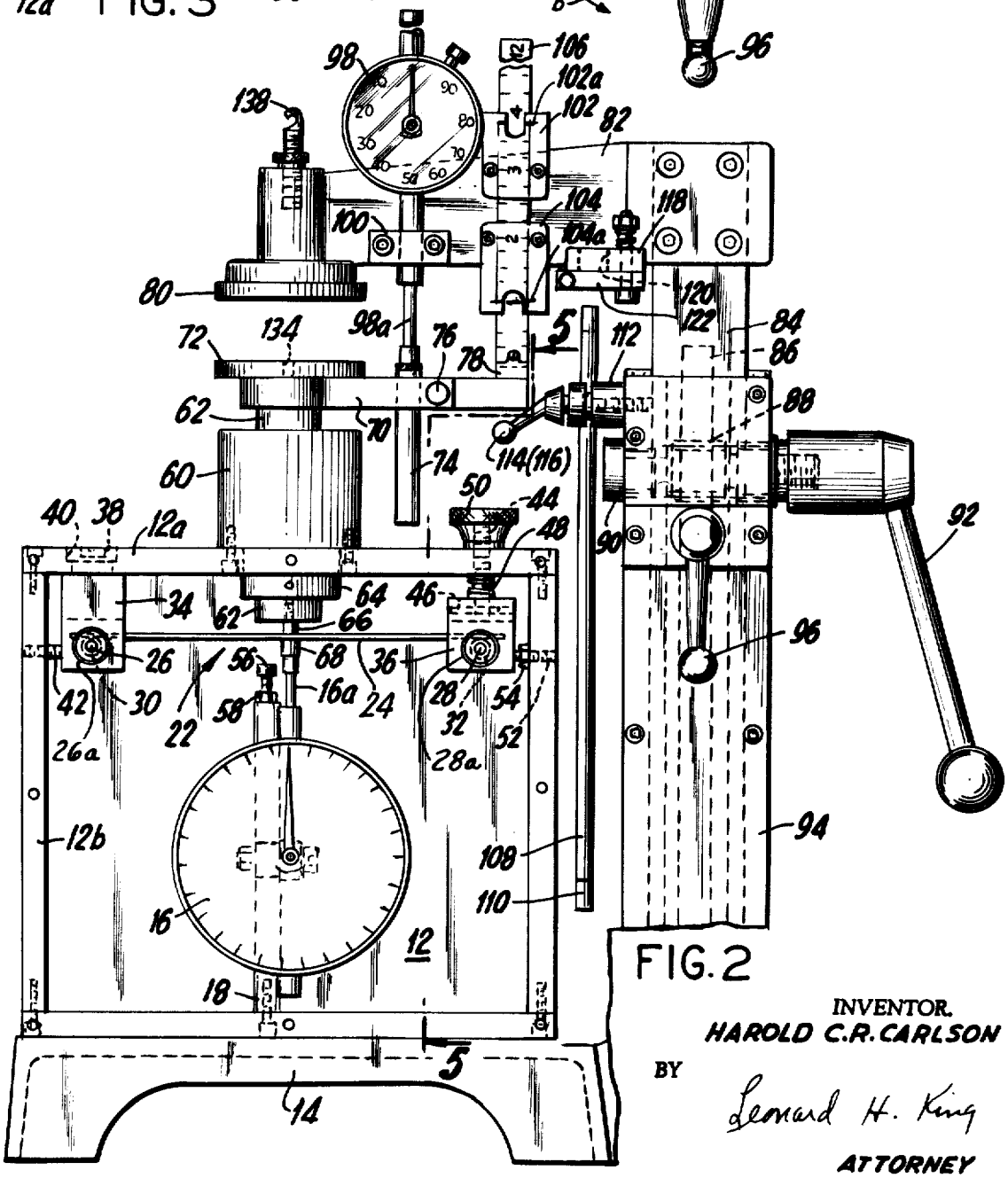
FIG. 2 is an elevational view of the present invention with the front cover of the load cell assembly removed.
Figure 5:
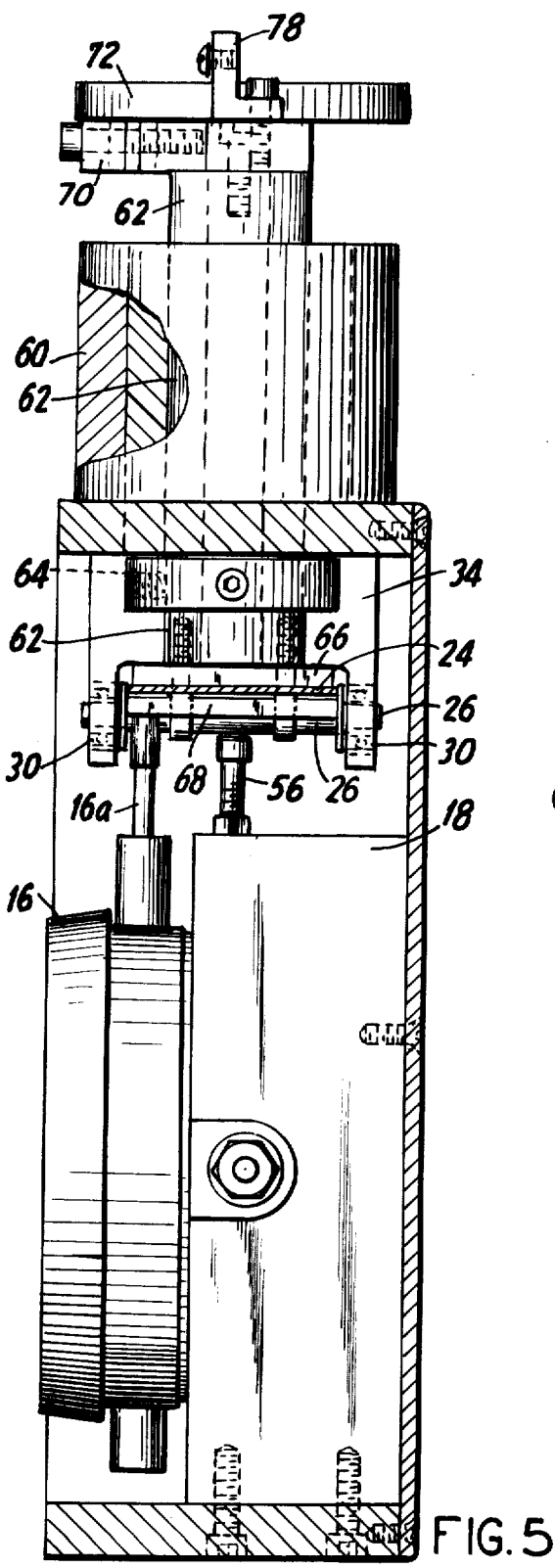
FIG. 5 is a sectional elevational view taken along line 5—5 of FIG. 2.
Figure 4:
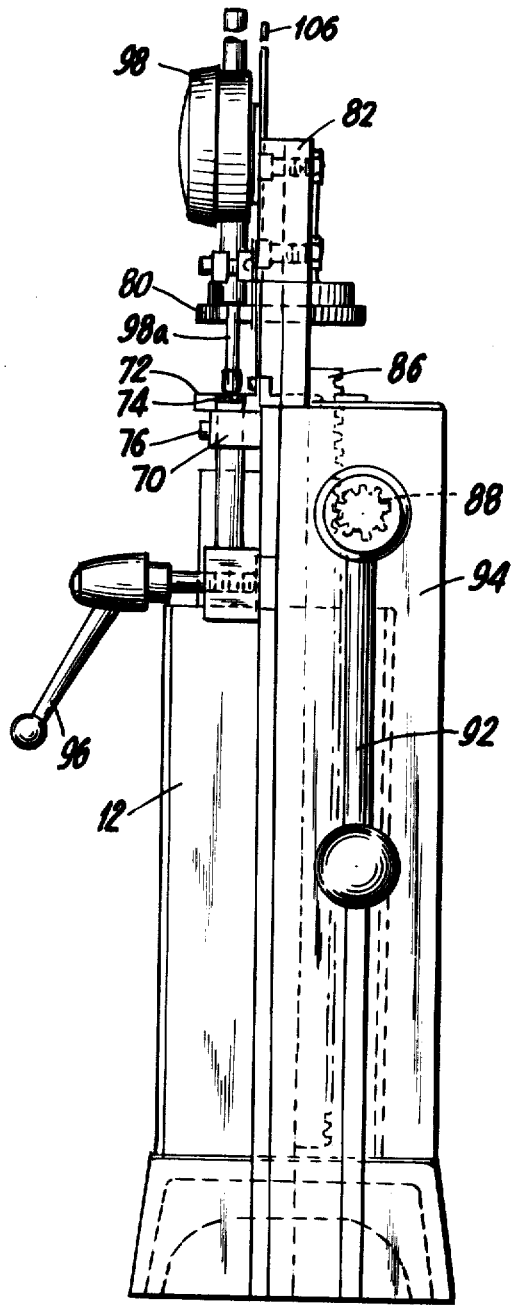
FIG. 4 is a side elevational view of the present invention.

A pair of stop rods 108 and 110 are adjustably mounted on the post 94 by means of a support bracket 112 secured at the upper end thereof. The stop rods 108 and 110 may be clamped in their adjusted positions by means of handles 114 and 116. Directly above the stop rods 108 and 110 are a pair of transverse plates 118 and 119 that are integrally formed with the arm 82. Openings 120, 121 are formed, each in the plates 118, 119, in coaxial opposition to the rods 108 and 110, respectively. Baffle members 122, 123 are pivotally secured to the plates 118, 119 and are positioned intermediate the openings 120, 121 and the stop rod 108, 110, so as to prevent movement of the stop rods during one mode of operation. For production testing, as will be explained more fully hereinafter, the baffle members 122, 123 may be pivoted in the directions of arrows a and b (FIG. 3).

Referring once again to FIG. 1, there is shown an attachment 124 for measuring the load and deflection of a tension spring. The attachment 124 is a frame comprised of upper and lower cross members 126 and 128, respectively, that are secured to each other by elongated sections 130. The frame 124 is adapted to be mounted on the lower compression plate 72 by means of a pin (not shown) that is located in a hole 132 in the lower cross member 128, the pin 132 being engaged in a hole 134 in the lower compression plate 72. The upper cross member 126 is provided with hook means 136 which, when the attachment 124 is properly positioned, is in opposition to a hook 138 that is secured on the top surface of the arm 82. The operation of the attachment 124 will be more fully described hereinafter in the section headed "MODE OF OPERATION—TENSION SPRINGS."

Figure 6:
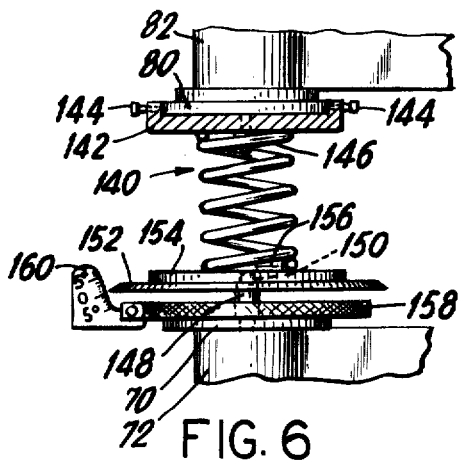
FIG. 6 is a fragmentary elevational view of an attachment for the present invention.

Referring now to FIG. 6, there is shown still another attachment 140 for measuring the squareness under load of a compression spring. The attachment 140 is comprised of an upper recessed plate 142 that is secured to the upper compression plate 80 by means of a plurality of angularly spaced screws 144. The recessed plate 142 is provided with a washer 146 that is selected to match the inside diameter of the spring, the washer 146 being removably secured to the plate 142. A swivel pin 148 having a hardened steel ball bearing 150 at the upper end thereof is mounted in the hole 134 formed on the lower compression plate 72. A swivel plate 152 is mounted on the swivel pin 148 and then a support plate 154 is mounted on the ball bearing 150 and the swivel plate 152. The support plate 154 is also provided with a washer 156 that is selected to match the inside diameter of the spring under test. An indicator plate 158 is mounted on the lower compression plate 72 directly below the swivel plate 152 and a scale 160 is attached to the indicator plate 158. The manner in which the attachment 140 is used will be fully described hereinafter in the section headed "MODE OF OPERATION—SQUARENESS UNDER LOAD.""

MODE OF OPERATION — COMPRESSION SPRINGS

The scale 106 is installed in the guides 102, 104 with the bottom end of the scale 106 flush with the top surface of the bottom compression plate 72. The lower indicating marker 104a should line up flush with the bottom of the upper compression plate 80. The dial indicator 98 is then fully compressed to read "0" with the upper and lower compression plate 80 and 72 respectively together. The two stop rods 108 and 110 can then be set to check springs at two different lengths.

First, a correct spring is preloaded and then the rods 108 and 110 are set accordingly. The movement of the compression plate 80 is 0.100 inch for each revolution of the pointer of the scale 98. But since the scale 106 moves with the compression plate 72, no adjustment is required. It should be noted that the length indicator 98 applies 2 ounces of pressure in all positions so that 2 ounces should be subtracted from the load displayed by the indicator 16 when using this indicator.

The plates 122, 123, on the arm 82 can be pivoted in an angular direction to permit the rods 108, 110 to be selectively bypassed. The two rods 108 and 110 can be used interchangeably for short and long springs.

The knob 50 is used to counterbalance the weight of the spring under test and to set the pointer of the indicator 16 to "0." It should be noted that the operating pressure on the indicator 16 is automatically compensated for by the force gage 22, so that allowances are not required. In this connection it should be noted that the force exerted by the force gage 22 can be manually adjusted by moving the yokes 34 laterally and then by using the screws 38 to secure the yoke in its adjusted position. This adjustment changes the effective length of the strip 24 so that the instrument can be calibrated using National Bureau of Standards weights. In the adjusted position, the loads are proportional to exactly two dial revolutions of the indicator 16.

MODE OF OPERATION — EXTENSION SPRINGS set as

The frame 124 is placed on the lower compression platform 72 with the spring under test being positioned on the hook 136. The tare knob 50 is then used to compensate for the weight of the frame 124 and the spring so that the dial indicator 16 may be reset to a zero load. The spring is then removed and a 1 inch gage is placed on both hooks. If necessary, the scale 106 is moved so that the 1 inch line is at the top and is set at the upper marker 102 a. To use the dial indicator 98 for length measurements, the indicator is either adjusted to read 1 inch or the striker rod 74 is moved until the indicator 98 reads 1 inch. The gage may then be removed and the spring replaced. If desired, the two stop rods 108 and 110 can be set as with compression springs.

The following example may be used to test the initial tension:

A spring is extended one-half inch and a first load, for example, of 9 pounds is noted. The spring is then extended exactly the same amount (one-half inch) and a second load (14 lbs.) is noted. The difference in these two loads subtracted from the first load is the initial tension. That is, 14 minus 9 equals 5 subtracted from 9 equals 4 lbs. of initial tension.

To test the rate or pounds per inch or gradient of a spring, the spring is deflected for any convenient distance and the first load is noted. The spring is then deflected any second convenient distance and the second load is noted. The difference in the two loads divided by the second amount of deflection is the rate. In this example 14 - 9 equals 5 and this number divided by one-half inch equals 10 lbs. per inch rate.

MODE OF OPERATION — SQUARENESS UNDER LOAD

The recessed plate 142 is secured to the upper compression plate 80 by means of screws 144. The pin 148, together with the hardened steel ball bearing 150, is inserted in the hole 134 in the lower compression plate 72. The knurled, rotating indicator 158 is placed over the pin 148 and the large swivel plate 152 is placed on the ball bearing 150. The spring under test is inserted between the recessed plate 142 and the support plate 154 using the washers 146 and 156 as guide means. The spring is then compressed to either the required length or load and the knurled indicator plate 158 is rotated so that the indicator scale 160 is at either the lowest or highest point of the swivel plate 152. The degrees of unsquareness can be read directly to within one-quarter of a degree since the calibrations on the indicator scale 160 are one-half degree apart. A maximum of 7° out of squareness can easily be read. An unsquare spring can then be marked with ink along its longest side and the ends reground accordingly.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. A tester for axially resilient articles such as springs, bellows or the like, said tester comprising the combination of:
   a. a housing;
   b. first platform means mounted on said housing, at least a portion of said first platform means being movable relative to said housing;
   c. second platform means positioned in spaced, parallel opposition to said first platform means whereby the article to be tested is adapted to be positioned between said first and said second platform means;
   d. actuating means for moving said second platform means whereby the length of the article is changed and the article thereby exerts a force on said first platform means;
   e. force gage means mounted in said housing, said force gage means being responsive and deflectable in direct proportion to the force exerted by the article and therefore the movement of said first platform means;
   f. first indicating means responsive to the deflection of said force gage means for displaying the force exerted by the article at a given deflection thereof; and
   g. second indicating means for displaying the deflection of the article at a given force exerted thereby wherein said second indicating means is calibrated for linear measurement and includes a plunger positioned in opposition to a portion of said first platform means.

2. A tester for axially resilient articles such as springs, bellows or the like, said tester comprising the combination of:
   a. a housing;
   b. first platform means mounted on said housing, at least a portion of said first platform means being movable relative to said housing;
   c. second platform means positioned in spaced, parallel opposition to said first platform means whereby the article to be tested is adapted to be positioned between said first and said second platform means;
   d. actuating means for moving said second platform means whereby the length of the article is changed and the article thereby exerts a force on said first platform means;
   e. force gage means mounted in said housing, said force gage means being responsive and deflectable in direct proportion to the force exerted by the article and therefore the movement of said first platform means;
   f. first indicating means responsive to the deflection of said force gage means for displaying the force exerted by the article at a given deflection thereof; and
   g. stop means for selectively limiting the movement of said second platform means wherein said stop means comprises at least two rods adjustably positioned relative to said first platform means and in opposition to a portion of said second platform means.

3. The tester in accordance with claim 2 wherein said second platform means includes a pair of integral extensions each of which is comprised of an opening larger than and coaxial with said rods whereby said rods may pass through said openings, each said extension including a plate for covering said respective opening whereby said second platform means abuts one of said plates to thereby prevent further movement of said second platform means.

4. A tester for axially resilient articles such as springs, bellows or the like, said tester comprising the combination of:
   a. a housing;
   b. first platform means mounted on said housing, at least a portion of said first platform means being movable relative to said housing;
   c. second platform means positioned in spaced, parallel opposition to said first platform means whereby the article to be tested is adapted to be positioned between said first and said second platform means;
   d. actuating means for moving said second platform means whereby the length of the article is changed and the article thereby exerts a force on said first platform means;
   e. force gage means mounted in said housing, said force gage means being responsive and deflectable in direct proportion to the force exerted by the article and therefore the movement of said first platform means;
   f. first indicating means responsive to the deflection of said force gage means for displaying the force exerted by the article at a given deflection thereof; and
   g. a frame having upper and lower cross members, said lower cross member including means for coupling said frame to said first platform means, such that said upper cross member is positioned above said second platform means, said upper cross member including means for engaging one end of the article to be tested, said second platform means also including means for engaging the other end of the article to be tested.

5. A tester for axially resilient articles such as springs, bellows or the like, said tester comprising the combination of:
   a. a housing;
   b. first platform means mounted on said housing, at least a portion of said first platform means being movable relative to said housing;
   c. second platform means positioned in spaced, parallel opposition to said first platform means whereby the article to be tested is adapted to be positioned between said first and said second platform means;
   d. first actuating means for moving said second platform means whereby the length of the article is changed and the article thereby exerts a force on said first platform means;
   e. force gage means mounted in said housing, said force gage means being responsive and deflectable in direct proportion to the force exerted by the article and therefore the movement of said first platform means wherein said force gage means comprises an elongated strip coupled at the midpoint thereof to said movable portion of said first platform means and first and second means for supporting said strip proximate the outboard ends thereof, said first supporting means comprising a yoke member, means for moving said yoke member in a direction substantially parallel to the longitudinal axis of said strip whereby the effective length of said strip is changed, roller means journalled in said yoke for tangentially contacting and supporting said end of said strip, and securing means for securing said yoke relative to said housing after the effective length of said strip is changed, said securing means comprising an elongated slot in said housing, a first screw extending through said slot and threaded into said yoke along an axis perpendicular to the plane of said strip and a second screw threaded into said housing and bearing against said yoke in a plane perpendicular to the axis of said first screw; and
   f. first indicating means responsive to the deflection of said force gage means for displaying the force exerted by the article at a given deflection thereof, said first indicating means including second actuating means therefor positioned in close proximity to the coupled portion of said strip.

6. The tester in accordance with claim 5 wherein said second supporting means is a yoke, screw means threaded into said housing and secured to said yoke and roller means for tangentially contacting and supporting said end of said strip whereby axial movement of said screw means deflects said strip end about the midpoint thereof and thereby changes the effective length thereof.

* * * * *